(12) United States Patent
Iwata et al.

(10) Patent No.: US 11,041,061 B2
(45) Date of Patent: Jun. 22, 2021

(54) POLYTETRAFLUOROETHYLENE COMPOSITION

(71) Applicant: DAIKIN INDUSTRIES, LTD., Osaka (JP)

(72) Inventors: Noriko Iwata, Osaka (JP); Masayuki Tsuji, Osaka (JP); Kazuya Kawahara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/533,583

(22) PCT Filed: Dec. 11, 2015

(86) PCT No.: PCT/JP2015/084850
§ 371 (c)(1),
(2) Date: Jun. 6, 2017

(87) PCT Pub. No.: WO2016/093356
PCT Pub. Date: Jun. 16, 2016

(65) Prior Publication Data
US 2017/0321034 A1   Nov. 9, 2017

(30) Foreign Application Priority Data

Dec. 12, 2014 (JP) .............................. JP2014-252244

(51) Int. Cl.
  *C08K 3/36* (2006.01)
  *C08L 27/18* (2006.01)
  *C08J 3/20* (2006.01)

(52) U.S. Cl.
  CPC .................. *C08K 3/36* (2013.01); *C08J 3/20* (2013.01); *C08L 27/18* (2013.01); *C08K 2201/005* (2013.01); *C08K 2201/011* (2013.01); *C08K 2201/013* (2013.01)

(58) Field of Classification Search
  CPC ................ C08K 3/36; C08K 2201/005; C08K 2201/011; C08L 27/18
  See application file for complete search history.

(56) References Cited

U.S. PATENT DOCUMENTS

| | | | | |
|---|---|---|---|---|
| 4,363,900 A | * | 12/1982 | Shimizu | ............ C08F 114/26 428/402 |
| 5,658,960 A | * | 8/1997 | Dolan | .................. B29B 9/02 521/57 |
| 5,804,654 A | | 9/1998 | Lo et al. | |
| 6,326,111 B1 | | 12/2001 | Chambers et al. | |
| 6,503,988 B1 | | 1/2003 | Kitahara et al. | |
| 2004/0026805 A1 | * | 2/2004 | Cody | ............... C08J 3/12 264/15 |
| 2008/0200571 A1 | * | 8/2008 | Higuchi | ............... C08F 2/26 521/65 |
| 2013/0122302 A1 | | 5/2013 | Miyamoto et al. | |
| 2014/0309355 A1 | | 10/2014 | Hayakawa et al. | |

FOREIGN PATENT DOCUMENTS

| | | |
|---|---|---|
| CN | 102464845 A | 5/2012 |
| EP | 1 161 941 A1 | 12/2001 |
| JP | 3-277639 A | 12/1991 |
| JP | 9-95583 A | 4/1997 |
| JP | 2001-315121 A | 11/2001 |
| JP | 2002-196516 A | 7/2002 |
| JP | 2002-235011 A | 8/2002 |
| JP | 2008-115336 A | 5/2008 |
| JP | 2010-202787 A | 9/2010 |
| JP | 2013-528663 A | 7/2013 |
| JP | 2014-208726 A | 11/2014 |
| JP | 2015-30827 A | 2/2015 |
| JP | 2015-134898 A | 7/2015 |
| JP | 2015-229605 A | 12/2015 |
| WO | 97/17382 A1 | 5/1997 |
| WO | 00/54752 A | 9/2000 |

OTHER PUBLICATIONS

Evonik Industries AG, Aerosil® 200F Product Information, 2012, p. 1-2 (Year: 2012).*
Evonik Industries AG, Aerosil® RX50 Product Information, 2012, p. 1-2 (Year: 2012).*
Evonik Industries AG, Aerosil®—Fumed Silica Technical Overview, 2015, p. 1-103 (Year: 2015).*
German, R.M.; Sintering: From Empirical Observations to Scientific Principles, 2014, p. 1-7.*
International Preliminary Report on Patentability with a Translation of Written Opinion issued from the International Bureau in counterpart International Application No. PCT/JP2015/084850, dated Jun. 13, 2017.
International Search Report for PCT/JP2015/084850, dated Mar. 1, 2016 (PCT/ISA/210).
Communication dated Jun. 5, 2018, from the European Patent Office in counterpart European Application No. 15866516.6.
Database WPI Week 199204 Thomson Scientific, London, GB; AN 1992-029796 & JP H03 277639 A (Sumitomo Electric IND Co),XP-002781321, Dec. 9, 1991 (2 pages total).
Database WPI Week 201065 Thomson Scientific, London, GB; AN 2010-L71530 & JP 2010 202787 A (Nitto Denko Corp),XP-002781322, Sep. 16, 2010 (2 pages total).

(Continued)

*Primary Examiner* — Robert S Jones, Jr.
(74) *Attorney, Agent, or Firm* — Sughrue Mion, PLLC

(57) ABSTRACT

The invention provides a polytetrafluoroethylene composition having high flowability. The polytetrafluoroethylene composition contains a particulate polytetrafluoroethylene having fibrillability and a particulate synthetic amorphous silica. The particulate polytetrafluoroethylene is a polytetrafluoroethylene fine powder or a polytetrafluoroethylene molding powder. The particulate synthetic amorphous silica is obtained by a dry process and has an average primary particle size smaller than 200 nm. The particulate synthetic amorphous silica is attached to the surface of the particulate polytetrafluoroethylene.

9 Claims, 1 Drawing Sheet

(56) References Cited

OTHER PUBLICATIONS

Database WPI Week 201517 Thomson Scientific, London, GB; AN 2015-127647 & JP 2015 030827 A (Shinetsu Chem Ind Co Ltd),XP-002781323. Feb. 16, 2015 (3 pages total).
Wang, Duoren, "Green Nano-chemicals/Compiled", Beijing: Scientific and Technical Documents Publishing House, Jul. 2007 (6 pages total) ISBN 978-7-5023-5641-5.
A Handbook of Wires and Cables, Book Two/Compiled by the editorial board of, "A Handbook of Wires and Cables", 2nd Edition (revised and enlarged edition), Apr. 2014, (4 pages total) ISBN 978-7-111-46325-2.

* cited by examiner

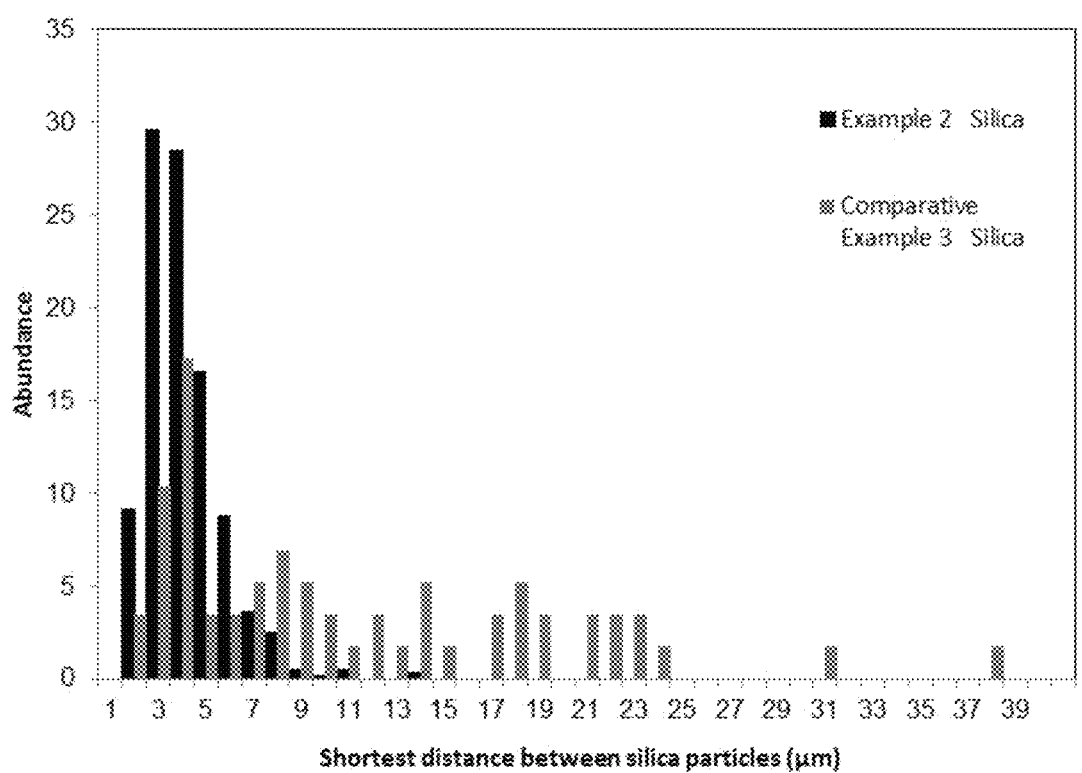

POLYTETRAFLUOROETHYLENE COMPOSITION

CROSS REFERENCE TO RELATED APPLICATIONS

This application is a National Stage of International Application No. PCT/JP2015/084850 filed Dec. 11, 2015, claiming priority based on Japanese Patent Application No. 2014-252244, filed Dec. 12, 2014, the contents of all of which are incorporated herein by reference in their entirety.

TECHNICAL FIELD

The present invention relates to polytetrafluoroethylene compositions containing a particulate polytetrafluoroethylene.

BACKGROUND ART

High-molecular-weight polytetrafluoroethylene has an ability to easily fiberize to form fibrils (fibrillability). Thus, particles of a polytetrafluoroethylene fine powder or molding powder are likely to aggregate or stick to the inner wall of a packing material during handling, such as transportation and mixing. It is therefore hard to say such a powder has excellent flowability and handleability. Aggregates formed during processes such as transportation and mixing are difficult to desegregate into powder with the original size, causing a decreased moldability and poor appearance of a molded article to be obtained.

Fibrillation is easily caused even by a very low shearing force. Thus, in the case of dispersing or blending a fine powder or molding powder in or to another material, the shearing force during the blending generates fibrils and the particulate polytetrafluoroethylene forms aggregates, which is difficult to re-disperse. This results in a failure in maintaining a uniformly dispersed state.

Then, Patent Literature 1 proposes a method for producing a polytetrafluoroethylene fine powder having a high apparent density and excellent flowability by adding fluorine-based anionic surfactant to a polytetrafluoroethylene aqueous dispersion in advance.

Patent Literature 2 proposes a method for producing a polytetrafluoroethylene fine powder having excellent handleability even though having a low apparent density by adding a surfactant at a predetermined timing during a coagulation step for producing the polytetrafluoroethylene fine powder.

CITATION LIST

Patent Literature

Patent Literature 1: WO 97/17382
Patent Literature 2: JP 2013-528663 T
Patent Literature 3: JP 2001-315121 A
Patent Literature 4: WO 00/054752
Patent Literature 5: JP 2002-235011 A
Patent Literature 6: JP H09-95583 A

SUMMARY OF INVENTION

Technical Problem

Nevertheless, there is still a demand for a simpler, more effective method for improving the flowability of a fine powder or molding powder of polytetrafluoroethylene having fibrillability.

In consideration of the above state of the art, the present invention aims to provide a polytetrafluoroethylene composition having high flowability even though having fibrillability.

Solution to Problem

The inventors presumed that adding a powder of an inorganic or organic compound to a fine powder or molding powder of polytetrafluoroethylene can lead to improvement of the flowability thereof.

There are some known techniques for adding a powder of an inorganic or organic compound so as to improve the flowability of particles of a material other than polytetrafluoroethylene having fibrillability.

For example, Patent Literature 3 discloses that coating at least part of the surface of powdery rubber with talc which serves as an anticaking agent prevents caking of powdery rubber particles, giving flowability to the powdery rubber and improving the handleability thereof.

Patent Literature 4 discloses, as examples of a surface-modifying base material which physically attaches to the surface of a powder to be surface-modified containing an active ingredient and optionally a diluent to improve the flowability of the powder, light silicic anhydride, talc, stearic acid, magnesium stearate, calcium stearate, starch, titanium oxide, citric acid, malic acid, adipic acid, hydrated silicon dioxide, and calcium carbonate.

Patent Literature 5 discloses use of a coagulation inhibitor for fluororesin to significantly mitigate coagulation of fluororesin itself and coagulation of fluororesin particles. This fluororesin is a melt-fabricable fluororesin having a melt flow index, not having fibrillability. Examples of the coagulation inhibitor for fluororesin disclosed are aromatic polyamide, aromatic polyester, graphite, potassium titanate whiskers, as well as silica.

Although the inventors have applied the above known techniques to polytetrafluoroethylene having fibrillability and examined the effects, such polytetrafluoroethylene having fibrillability has a unique feature that other compounds do not have, i.e., an ability to easily fiberize, and thus the inventors found conventionally known powder fails to sufficiently prevent coagulation of a particulate polytetrafluoroethylene.

Patent Literature 6 discloses a polymer blend in the form of freely flowable powder containing a tetrafluoroethylene polymer entirely or partially enclosed in a polymer or copolymer such as a styrene-acrylonitrile (SAN) copolymer. Still, this technique requires the use of 40 mass % or more of the polymer or copolymer relative to the tetrafluoroethylene polymer, and thus excellent properties of the tetrafluoroethylene polymer are not easily imparted to a molded article to be obtained. Further, the presence of the SAN copolymer unfortunately causes yellowing of a molded article.

The inventors studied the above Solution to Problem, and found that use of a specific particulate silica, even in a small amount, can significantly improve the flowability of a fine powder or molding powder of polytetrafluoroethylene even though the polytetrafluoroethylene has fibrillability. Thereby, they have completed the present invention. The inventors also found that even in the case of molding a particulate polytetrafluoroethylene to which a specific particulate silica is added, the resulting product shows no yellowing, in other words, a beautiful molded article can be obtained.

Specifically, the present invention relates to a polytetrafluoroethylene composition containing:

a particulate polytetrafluoroethylene having fibrillability; and a particulate synthetic amorphous silica, the particulate polytetrafluoroethylene being a polytetrafluoroethylene fine powder or a polytetrafluoroethylene molding powder, the particulate synthetic amorphous silica being obtained by a dry process and having an average primary particle size smaller than 200 nm, the particulate synthetic amorphous silica being attached to the surface of the particulate polytetrafluoroethylene.

The particulate synthetic amorphous silica preferably has a hydrophilic group on the surface thereof.

The particulate synthetic amorphous silica also preferably has a hydrophobized surface.

The particulate polytetrafluoroethylene is preferably a polytetrafluoroethylene fine powder having an average particle size of 100 to 1000 μm.

The particulate polytetrafluoroethylene is also preferably a polytetrafluoroethylene molding powder having an average particle size of 1 to 2000 μm.

Preferably, the polytetrafluoroethylene composition contains the polytetrafluoroethylene fine powder as the particulate polytetrafluoroethylene and has an average particle size of 100 to 1000 μm.

Also preferably, the polytetrafluoroethylene composition contains the polytetrafluoroethylene molding powder as the particulate polytetrafluoroethylene and has an average particle size of 1 to 2000 μm.

The polytetrafluoroethylene composition is preferably obtainable by dry mixing or wet mixing the particulate polytetrafluoroethylene and the particulate synthetic amorphous silica.

The particulate synthetic amorphous silica is preferably present in an amount of 0.01 to 10 parts by mass relative to 100 parts by mass of the particulate polytetrafluoroethylene.

The polytetrafluoroethylene composition preferably satisfies that, in powder flowability evaluation, the sieve-passing percentage reaches 50% or higher within 50 seconds.

The polytetrafluoroethylene composition preferably satisfies that, in powder flowability evaluation, the sieve-passing percentage reaches 80% or higher within 30 seconds.

The present invention also relates to a molded article which is obtainable from the polytetrafluoroethylene composition.

The present invention also relates to a composition containing the above polytetrafluoroethylene composition and at least one selected from the group consisting of thermoplastic resins and thermosetting resins.

The present invention also relates to a molded article obtainable from the above composition.

Advantageous Effects of Invention

Since the polytetrafluoroethylene composition of the present invention has the aforementioned configuration, it has high flowability. The polytetrafluoroethylene composition of the present invention has high flowability even though it contains a small amount of particulate silica. Thus, the composition can provide a molded article which can sufficiently exert excellent characteristics that polytetrafluoroethylene is expected to achieve. Even in the case of molding the polytetrafluoroethylene composition of the present invention, the resulting product shows no yellowing, in other words, a beautiful molded article can be obtained.

The polytetrafluoroethylene molded article of the present invention has excellent characteristics of polytetrafluoroethylene, and has excellent appearance.

BRIEF DESCRIPTION OF THE DRAWINGS

FIG. 1 shows a histogram of polytetrafluoroethylene compositions of Example 2 and Comparative Example 3, with the horizontal axis showing the shortest distance between silica particles attached to the surface of the particulate polytetrafluoroethylene, while the vertical axis showing the number of particles (abundance) having the above shortest distance.

DESCRIPTION OF EMBODIMENTS

The present invention will be specifically described hereinbelow.

The polytetrafluoroethylene (PTFE) composition of the present invention contains a particulate PTFE and a particulate synthetic amorphous silica, and the particulate synthetic amorphous silica is attached to the surface of the particulate PTFE. The particulate PTFE is a PTFE fine powder or a PTFE molding powder.

Attachment of the particulate synthetic amorphous silica to the surface of the particulate PTFE can be confirmed by observing the PTFE composition using an electron microscope.

For easy production and excellent flowability of the PTFE composition, the PTFE composition is preferably one obtained by dry mixing or wet mixing the particulate PTFE and the particulate synthetic amorphous silica.

The dry mixing may be achieved by, for example, a method of mixing dry PTFE secondary particles with a dry particulate synthetic amorphous silica or a method of spraying an aqueous solution of a particulate synthetic amorphous silica on dry PTFE secondary particles and then drying the mixture.

The wet mixing may be achieved by, for example, a method of coagulating PTFE primary particles in an aqueous dispersion to form secondary particles, adding the particulate synthetic amorphous silica thereto without drying to cause the particulate synthetic amorphous silica to attach to the surface of the particulate PTFE, and then washing and drying the mixture to form the target powder. The wet mixing may also be achieved by a method of adding a PTFE fine powder or molding powder to a dispersion containing the particulate synthetic amorphous silica and then coagulating the particles to form the target powder.

For the mixing of the PTFE fine powder and the synthetic amorphous silica, a method of adding a particulate synthetic amorphous silica to a dispersion containing PTFE primary particles and then coagulating the particles to form the target powder and a method of mixing a dispersion containing PTFE primary particles and a dispersion containing a particulate synthetic amorphous silica and then coagulating the particles to form a powder provide a PTFE composition in which the particulate synthetic amorphous silica is enclosed in secondary particles of the PTFE fine powder, failing to provide the PTFE composition of the present invention.

In order to have excellent flowability, the PTFE composition is preferably a dry powder.

Preferably, the PTFE composition contains the PTFE fine powder as the particulate PTFE and has an average particle size of 100 to 1000 µm. The average particle size is more preferably 300 µm or larger while more preferably 700 µm or smaller.

Also preferably, the PTFE composition contains the PTFE molding powder as the particulate PTFE and has an average particle size of 1 to 2000 µm. The average particle size is more preferably 1000 µm or smaller, still more preferably 700 µm or smaller.

The average particle size of the PTFE composition is determined in conformity with JIS K6891.

In the PTFE composition, the amount of the particulate synthetic amorphous silica is preferably 0.01 to 10 parts by mass, more preferably 0.1 parts by mass or more while more preferably 3 parts by mass or less, relative to 100 parts by mass of the particulate PTFE. Too small an amount of the particulate synthetic amorphous silica may cause poor flowability of the PTFE composition. Too large an amount of the particulate synthetic amorphous silica may cause poor physical properties of a molded article obtainable by molding the PTFE composition.

The PTFE composition contains a particulate synthetic amorphous silica. Silica is classified into natural silica and synthetic silica, and the synthetic silica includes crystalline ones and amorphous ones. The synthetic amorphous silica is classified into those prepared by a dry process, obtainable by combustion or obtainable from byproducts of combustion, and those prepared by a wet process, such as precipitation, gelation, or the sol-gel process. The synthetic amorphous silica may be one prepared by a dry process. One example of the particulate synthetic amorphous silica prepared by a dry process is a fumed particulate silica.

The particulate synthetic amorphous silica preferably has an average primary particle size smaller than 200 nm, more preferably 100 nm or smaller, still more preferably 50 nm or smaller, while preferably 5 nm or larger. If the average primary particle size is within this range, the particulate synthetic amorphous silica is likely to be uniformly attached to the surface of the particulate PTFE, leading to a PTFE composition having much higher flowability.

The average primary particle size of the particulate synthetic amorphous silica can be determined by analyzing an image taken using a scanning electron microscope.

The particulate synthetic amorphous silica preferably has a hydrophilic group on the surface thereof. Examples of the hydrophilic group include a hydroxy group, a silanol group, a carboxyl group, and an amino group. The hydrophilic group on the surface of the particulate synthetic amorphous silica may be a hydrophilic group that the synthetic amorphous silica originally has, or may be a hydrophilic group introduced by a known method.

In order to achieve much higher flowability of the PTFE composition, the particulate synthetic amorphous silica also preferably has a hydrophobized surface. The hydrophobization introduces a hydrophobic group into the surface of the particulate synthetic amorphous silica. The hydrophobization may convert all the hydrophilic groups to hydrophobic groups, or may convert part of the hydrophilic groups to a hydrophobic group(s). The hydrophobized synthetic amorphous silica can lead to higher flowability than a particulate synthetic amorphous silica without hydrophobization.

Examples of the hydrophobization include a method of treating the surface of a particulate synthetic amorphous silica with a silane-coupling agent and an organosilazane in a liquid medium containing water, a method of spraying a treating agent in an inert gas atmosphere, and a method of treating the surface of an original silica powder with non-reactive silicone oil. One example of the method of treating the surface of an original silica powder with non-reactive silicone oil is a method disclosed in JP 2014-162681 A.

The silane-coupling agent is preferably at least one selected from the group consisting of phenyltrimethoxysilane, vinyltrimethoxysilane, epoxytrimethoxysilane, methacryltrimethoxysilane, aminotrimethoxysilane, ureidotrimethoxysilane, mercaptotrimethoxysilane, isocyanate, and acryltrimethoxysilane.

The organosilazane is preferably at least one selected from the group consisting of tetramethyldisilazane, hexamethyldisilazane, and pentamethyldisilazane.

In order to achieve much higher flowability of the PTFE composition, the particulate synthetic amorphous silica preferably has a hydrophobic group on the surface thereof. Examples of the hydrophobic group include C1-C8 alkyl groups and dimethyl polysiloxane structures. The hydrophobic group can be introduced by the above hydrophobization.

The particulate synthetic amorphous silica preferably has a specific surface area of 10 to 400 $m^2/g$, more preferably 50 to 380 $m^2/g$.

The PTFE composition contains the particulate PTFE. The particulate PTFE is a PTFE fine powder or a PTFE molding powder. The PTFE fine powder is a powder (secondary particles) obtainable by emulsion polymerizing tetrafluoroethylene (TFE) to form a PTFE aqueous dispersion, and then coagulating PTFE primary particles in the PTFE aqueous dispersion. The PTFE molding powder is a powder obtainable by suspension polymerizing TFE. The PTFE fine powder and the PTFE molding powder each may be obtainable by granulating the particles obtained by polymerization by a known method.

The particulate PTFE is formed from PTFE having fibrillability. The term "fibrillability" herein means an ability to easily fiberize to form fibrils. The particulate PTFE having fibrillability can provide a continuous paste-extrusion bead by paste extrusion molding, and this bead (unsintered bead) shows elongation. In contrast, any particulate PTFE without fibrillability fails to provide such a continuous paste-extrusion bead by paste extrusion or, even if obtained, the unsintered bead hardly shows elongation.

The particulate PTFE is preferably formed from PTFE having a number average molecular weight exceeding 600000. If the number average molecular weight of the PTFE is within this range, the particulate PTFE shows fibrillability.

The number average molecular weight can be determined by a method utilizing the standard specific gravity (SSG) or dynamic mechanical analysis in a molten state (details of the measurement are described by S. Wu in Polymer Engineering & Science, 1988, Vol. 28, 538, and 1989, Vol. 29, 273). The method of measuring the SSG will be described later.

The PTFE preferably has not only fibrillability but also non-melt-fabricability. The term "non-melt-fabricability" herein means that the polymer cannot be processed by melting.

The particulate PTFE is preferably a PTFE fine powder having an average particle size of 100 to 1000 µm. The average particle size is more preferably 300 µm or larger, while more preferably 700 µm or smaller. If the average particle size is too large, the particulate PTFE may be difficult to mold or to mix with other resin. If the average particle size is too small, the PTFE composition may have poor flowability.

The particulate PTFE is also preferably a PTFE molding powder having an average particle size of 1 to 2000 µm. The average particle size is more preferably 1000 µm or smaller, still more preferably 700 µm or smaller. If the average particle size is too large, the particulate PTFE may be difficult to mold or to mix with other resin. If the average particle size is too small, the PTFE composition may have poor flowability.

The average particle size of the particulate PTFE is determined in conformity with JIS K6891.

The PTFE may be a homo-PTFE consisting only of TFE or may be modified PTFE. The modified PTFE contains a TFE unit and a modifying monomer unit based on a modifying monomer copolymerizable with TFE.

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; ethylene; and fluorine-containing vinyl ethers containing a nitrile group. One modifying monomer may be used or multiple modifying monomers may be used.

The perfluorovinyl ethers may be any ones, and examples thereof include unsaturated perfluoro compounds represented by the following formula (1):

$$CF_2=CF-ORf^1 \quad (1)$$

wherein $Rf^1$ is a perfluoro organic group. The term "perfluoro organic group" herein means an organic group in which all the hydrogen atoms bonding to any of the carbon atoms are replaced by fluorine atoms. The perfluoro organic group may contain ether oxygen.

Specific examples of the perfluorovinyl ethers include perfluoro(alkyl vinyl ethers) (PAVEs) represented by the formula (1) wherein $Rf^1$ is a C1-C10 perfluoroalkyl group. The carbon number of the perfluoroalkyl group is preferably 1 to 5.

Examples of the perfluoroalkyl group in the PAVEs include a perfluoro methyl group, a perfluoro ethyl group, a perfluoro propyl group, a perfluoro butyl group, a perfluoro pentyl group, and a perfluoro hexyl group. Preferred is perfluoro propyl vinyl ether (PPVE) in which the perfluoroalkyl group is a perfluoro propyl group.

For the perfluorovinyl ethers, mention may be made to those represented by the formula (1) wherein $Rf^1$ is a C4-C9 perfluoro(alkoxy alkyl) group, those represented by the formula (1) wherein $Rf^1$ is a group represented by the following formula:

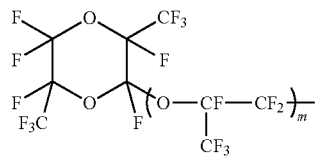

(wherein m is 0 or an integer of 1 to 4), and those represented by the formula (1) wherein $Rf^1$ is a group represented by the following formula:

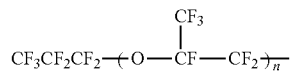

(wherein n is an integer of 1 to 4).

The perfluoroalkyl ethylenes may be any ones, and examples thereof include perfluoro butyl ethylene (PFBE) and perfluoro hexyl ethylene (PFHE).

The fluorine-containing vinyl ethers containing a nitrile group are more preferably fluorine-containing vinyl ethers represented by $CF_2=CFORf^2CN$ wherein $Rf^2$ is a C2-C7 alkylene group in which an oxygen atom may exist between two carbon atoms.

The modifying monomer in the modified PTFE is preferably at least one selected from the group consisting of HFP, CTFE, VDF, PPVE, PFBE, and ethylene. It is more preferably at least one monomer selected from the group consisting of HFP and CTFE.

The modified PTFE preferably contains 0.001 to 2 mol %, more preferably 0.001 to less than 1 mol %, of the modifying monomer unit.

The amounts of the respective monomers constituting the PTFE herein can be calculated by appropriately combining any of NMR, FT-IR, elemental analysis, and X-ray fluorescence analysis in accordance with the types of the monomers.

The PTFE preferably has a melting point of 324° C. to 360° C. The melting point is the temperature corresponding to the maximum value on a heat-of-fusion curve obtained at a temperature-increasing rate of 10° C./min using a differential scanning calorimeter (DSC).

The PTFE preferably has a standard specific gravity (SSG) of 2.20 or lower. The lower limit of the SSG is preferably 2.12, more preferably 2.15. For good moldability, the upper limit thereof is more preferably 2.19. The SSG is a value determined by the water replacement method in conformity with ASTM D792 using a sample molded in conformity with ASTM D4895-98.

The PTFE composition can satisfy that, in powder flowability evaluation, the sieve-passing percentage reaches 50% or higher within 50 seconds. The PTFE composition can also satisfy that, in powder flowability evaluation, the sieve-passing percentage reaches 80% or higher within 30 seconds. The sieve-passing percentage can be determined by the method to be mentioned later. The higher the sieve-passing percentage is, the higher the flowability is.

The PTFE composition may contain any of resins such as PS and SAN, as obtainable by the method disclosed in JP H09-95583 A, and additives such as filler and an auxiliary agent for adjustment of mechanical strength. It should be noted that the presence of resins such as PS and SAN may cause problems such as coloring, although the flowability is much improved.

The PTFE composition can also suitably be used as a material for stretched films, a material for porous articles, a processing aid, an anti-dripping agent, an unsintered tape, and a binder for batteries.

The PTFE composition may be directly molded into a molded article, or may be mixed with a polymer different from the PTFE, and then molded into a molded article. A molded article obtainable from the PTFE composition is also one aspect of the present invention.

Examples of the different polymer include thermoplastic resins and thermosetting resins other than the PTFE. Preferred are thermoplastic resins. A composition containing the above polytetrafluoroethylene composition and at least one selected from the group consisting of thermoplastic resins and thermosetting resins is also one aspect of the present invention. A molded article obtainable from this composition is also one aspect of the present invention.

Examples of the thermoplastic resins include polycarbonate, polyolefin, polyvinyl chloride, polystyrene, polyester, polyamide, ABS resin, and acrylic resin. Still, any other thermoplastic resins may suitably be used.

Examples of the thermosetting resins include urethane resin and epoxy resin. Still, any other thermosetting resins may suitably be used.

Provided that the amount of the at least one selected from the group consisting of the thermoplastic resins and the thermosetting resins is defined as 100 parts by mass, the above composition preferably contains the PTFE composition in an amount of 0.1 to 10 parts by mass, more preferably 0.2 parts by mass or more while 5 parts by mass or less.

The molded article can be produced by molding the PTFE composition or the composition by a known method. Examples of the molding method include extrusion molding, injection molding, compression molding, and blow molding. Since the PTFE composition has high flowability, it is easily molded and can provide a molded article with good appearance. If the PTFE composition is directly molded without being mixed with another polymer, a conventionally known molding method for PTFE can be used.

The molded article may be in any shape such as, but not limited to, a sheet, a film, a rod, a pipe, or a fiber.

The molded article may be in the form of, but are not limited to, a seal, a film, a sheet, a filter, a tube, a pipe, a hose, an OA equipment housing, an electric wire coat, a string, a rope, or a net.

EXAMPLES

The present invention will be specifically described with reference to, but not limited to, examples.
(A) Method of Producing PTFE Fine Powder TFE was emulsion polymerized to form a PTFE aqueous dispersion, and then primary particles in the PTFE aqueous dispersion were coagulated to form secondary particles. Then, the secondary particles were dried, whereby a PTFE fine powder having fibrillability was obtained.
(Method of Measuring Average Particle Size of PTFE Fine Powder)

This parameter was determined by the following method in conformity with JIS K6891.

A sieving system equipped with 10-, 20-, 32-, 48-, 60-, and 83-mesh sieves, a cover, and a saucer was prepared. Next, 50 g of a sample was precisely weighed and put on a 10-mesh sieve, and then passed through the sieve system for 15 minutes using a Ro-Tap sieve shaker. After the sieving, the amounts of the sample fractions on the respective sieves and the amount of the sample fraction passed through the 83-mesh sieve were weighed. The proportions (wt %) of the respective fractions were calculated, and the 50 wt % particle size was defined as the average particle size.
(Method of Measuring Average Primary Particle Size of Synthetic Amorphous Silica)

This parameter was determined by taking an image using a scanning electron microscope and analyzing the image. Specifically, 50 images of the powder were taken with different visual fields using a scanning electron microscope with a magnification of 100000×, and the average primary particle size of 2500 particles of original silica powder was determined by image analysis, whereby the number average primary particle size was determined.
(Method of Measuring Average Particle Size of PTFE Composition)

This parameter was determined by the following method in conformity with JIS K6891.

A sieving system equipped with 10-, 20-, 32-, 48-, 60-, and 83-mesh sieves, a cover, and a saucer was prepared. Next, 50 g of a sample was precisely weighed and put on a 10-mesh sieve, and then passed through the sieve system for 15 minutes using a Ro-Tap sieve shaker. After the sieving, the amounts of the sample fractions on the respective sieves and the amount of the sample fraction passed through the 83-mesh sieve were weighed. The proportions (wt %) of the respective fractions were calculated, and the 50 wt % particle size was defined as the average particle size.
(Measurement of Sieve-Passing Percentage)

The sieve-passing percentage was determined every 10 seconds of shaking by the following steps (i) to (vii) at 25° C.

(i) A sheet of circular weighing paper (diameter: 50 mm) was placed on the bottom of a stainless steel cylindrical cup (inner diameter: 50 mm (actual value: 51.7 mm), capacity: 150 ml), and another sheet of weighing paper was wrapped around the inner side surface of the cup.

(ii) The PTFE composition was passed through a 10-mesh sieve, and the fraction passed through the mesh was filled into the cylindrical cup to overflowing.

(iii) The powder surface of the PTFE composition in the cylindrical cup was leveled with a ruler, and the cover was put on the top.

(iv) The workpiece was tapped 300 times using Powder Characteristics Tester (Hosokawa Micron Corp.) (tapping height: 20 mm).

(v) After the tapping, a cake of the PTFE composition in the cylindrical cup was gently put on a 10-mesh sieve so as not to break the cake, and the PTFE composition passed through the mesh was weighed.

(vi) The PTFE composition left on the 10-mesh sieve was shaken for 10 seconds using Powder Characteristics Tester (Hosokawa Micron Corp.). The shaking amplitude was 0.05 to 0.1 mm.

(vii) The mass of the PTFE composition dropped by shaking was measured every 10 seconds, and the sieve-passing percentage was determined by the following formula:

(Sieve-passing percentage)=(mass of the PTFE composition passed through the sieve by shaking)/ (the whole mass of the PTFE composition)×100 (mass %).

(Observation of Yellowing)

The PTFE composition was mixed with polycarbonate (PC) such that the amount of the PTFE active ingredient was 0.5 parts by mass relative to 100 parts by mass of the PC. This mixture was extrusion molded or injection molded, whereby a molded article was obtained. Then, the respective molded articles were visually observed. Molded articles with yellowing were evaluated as "present", while molded articles without yellowing were evaluated as "absent".

Example 1

The PTFE fine powder (average particle size: 526 μm, SSG: 2.177) obtained by the production method described in the above section (A) and a fumed silica (a) (average primary particle size: 12 nm) containing a hydrophilic group were blended at the ratio shown in Table 1, and this blend was dry mixed. Thereby, a PTFE composition (average particle size: 486 μm) with the fumed silica (a) attached to the surface of the PTFE fine powder was obtained. Table 1 shows the sieve-passing percentages and the result of the observation of yellowing.

Example 2

Except that a fumed silica (b) (average primary particle size: 12 nm) containing a hydrophobic group introduced by surface treatment was used, a PTFE composition (average particle size: 490 μm) with the fumed silica (b) attached to the surface of the PTFE fine powder was obtained in the same manner as in Example 1. Table 1 shows the sieve-passing percentages and the result of the observation of yellowing.

Comparative Example 1

With regard to the PTFE fine powder obtained by the production method described in the section (A), Table 1 shows the sieve-passing percentages and the result of the observation of yellowing.

Comparative Example 2

During the production method of the section (A), the fumed silica (b) containing a hydrophobic group was added to the PTFE aqueous dispersion to prepare a solution mixture. This mixture was coagulated and the coagulated particles were dried. Thereby, a PTFE composition with the fumed silica (b) not attached to the surface of the PTFE fine powder was obtained. Table 1 shows the sieve-passing percentages and the result of the observation of yellowing.

Comparative Example 3

The PTFE fine powder obtained by the production method described in the section (A) and a fumed silica (c) having an average primary particle size of 200 nm were blended at the ratio shown in Table 1. Then, in the same manner as in Example 1, a PTFE composition with the fumed silica (c) attached to the surface of the PTFE fine powder was obtained. Table 1 shows the sieve-passing percentages and the result of the observation of yellowing.

Comparative Example 4

With regard to a composite PTFE (PTFE/SAN=50/50 (mass ratio)) (trade name: BLENDEX 449, Sabic IP), Table 1 shows the sieve-passing percentages and the result of the observation of yellowing.

every silica particle in the micrograph. FIG. 1 shows a histogram of the number of silica particles (abundance) relative to the shortest distance. The figure shows that more silica particles were present closer to each other and the silica particles attached to the surface of the particulate PTFE were more uniformly dispersed in the PTFE composition of Example 2 than in the PTFE composition of Comparative Example 3.

The invention claimed is:

1. A polytetrafluoroethylene composition comprising:
   a particulate polytetrafluoroethylene having fibrillability; and
   a particulate synthetic amorphous silica,
   the particulate polytetrafluoroethylene being a polytetrafluoroethylene fine powder,
   the particulate synthetic amorphous silica being obtained by a dry process and having an average primary particle size of 5 to 50 nm,
   the particulate synthetic amorphous silica being attached to the surface of the particulate polytetrafluoroethylene,
   wherein the particulate synthetic amorphous silica is present in an amount of 0.1 to 1 parts by mass relative to 100 parts by mass of the particulate polytetrafluoroethylene,
   wherein the particulate synthetic amorphous silica has a hydrophobized surface, and
   wherein, in powder flowability evaluation, the sieve-passing percentage reaches 50% or higher within 50 seconds.

2. The polytetrafluoroethylene composition according to claim 1,
   wherein the particulate synthetic amorphous silica has a hydrophilic group on the surface thereof.

3. The polytetrafluoroethylene composition according to claim 1,
   wherein the particulate polytetrafluoroethylene is a polytetrafluoroethylene fine powder having an average particle size of 100 to 1000 μm.

4. The polytetrafluoroethylene composition according to claim 1,

TABLE 1

| | | Example 1 | Example 2 | Comparative Example 1 | Comparative Example 2 | Comparative Example 3 | Comparative Example 4 |
|---|---|---|---|---|---|---|---|
| PTFE composition (parts by mass) | PTFE fine powder | 100 | 100 | 100 | 100 | 100 | Composite PTFE |
| | Fumed silica (a) | 1 | | | | | |
| | Fumed silica (b) | | 1 | | 1 | | |
| | Fumed silica (c) | | | | | 1 | |

| | | Sieve-passing percentage (%) | | | | | |
|---|---|---|---|---|---|---|---|
| Sieve-shaking time (sec) | 0 | 0 | 11 | 34 | 14 | 16 | 6 |
| | 10 | 33 | 97 | 20 | 21 | 23 | 21 |
| | 20 | 62 | 98 | 20 | 21 | 25 | 28 |
| | 30 | 83 | — | 20 | 22 | 26 | 33 |
| | 40 | 90 | — | 21 | 23 | 27 | 36 |
| | 50 | 92 | — | 21 | 23 | 28 | 38 |
| Observation of yellowing | | Absent | Absent | Absent | Absent | Absent | Present |

Using a scanning electron microscope, electron micrographs (500×, 172 μm×172 μm) of the PTFE compositions of Example 2 and Comparative Example 3 were taken. Then, the distance was measured between one silica particle attached to the surface of the particulate PTFE fine powder and another silica particle adjacent to the former particle at the shortest distance. This measurement was performed on wherein the polytetrafluoroethylene composition has an average particle size of 100 to 1000 μm.

5. The polytetrafluoroethylene composition according to claim 1, which is obtainable by dry mixing or wet mixing the particulate polytetrafluoroethylene and the particulate synthetic amorphous silica.

6. The polytetrafluoroethylene composition according to claim 1,
wherein, in powder flowability evaluation, the sieve-passing percentage reaches 80% or higher within 30 seconds.

7. A molded article which is obtainable from the polytetrafluoroethylene composition according to claim 1.

8. A composition comprising
the polytetrafluoroethylene composition according to claim 1, and
at least one selected from the group consisting of thermoplastic resins and thermosetting resins.

9. A molded article which is obtainable from the composition according to claim 8.

* * * * *